Feb. 2, 1954 — D. E. GOMMEL — 2,667,904

MULTIPLE-TOOTHED CIRCULAR SAW WITH STABILIZING HOLES

Filed Nov. 20, 1952

INVENTOR.
DEWEY E. GOMMEL,
BY: Harold B. Hood
ATTORNEY.

Patented Feb. 2, 1954

2,667,904

UNITED STATES PATENT OFFICE 2,667,904

MULTIPLE-TOOTHED CIRCULAR SAW WITH STABILIZING HOLES

Dewey E. Gommel, Indianapolis, Ind., assignor to Borg-Warner Corporation, Chicago, Ill., a corporation of Illinois Application November 20, 1952, Serial No. 321,590

6 Claims. (Cl. 143—137)

The present invention relates to circular saw blades, and is particularly concerned with the problem of providing, in such blades, a system of perforation units of such character as to stabilize such blades. The invention deals directly with the problem of providing for such stabilization of blades which are so small and which have so many teeth that it is impossible to arrange a single series of perforations of adequate individual area, equal in number to the teeth, in a single concentric series.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
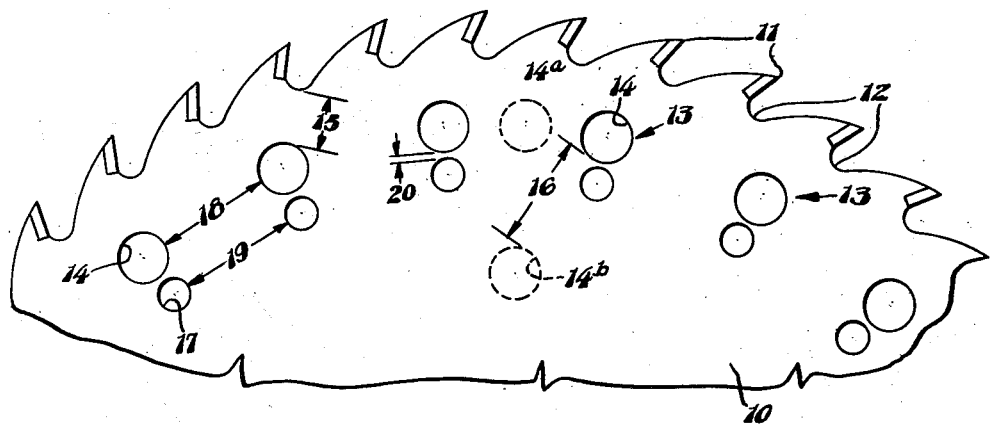
Fig. 1 is a fragmentary elevation of a saw blade constructed in accordance with the present invention, certain dimension lines and hypothetical perforations appearing therein.

In Fig. 1, the reference numeral 10 indicates generally a circular saw blade provided with a circular series of teeth 11 separated by gullets 12, said blade being centrally perforated or otherwise formed (not shown) for mounting upon a suitable spindle, all in accordance with conventional practice. In the particular type of blade selected for illustration, the actual cutting elements are bits of tungsten-carbide suitably secured to the blade. Saws of this character are relatively small in diameter and are provided with a large number of teeth in closely-spaced peripheral arrangement.

The patent to Chapin, No. 2,609,017, issued September 2, 1952, shows how stabilization of a blade can be accomplished by the arrangement, near its periphery, of a single series of perforations, equal in number, but staggered in relation, to the teeth of the blade. I have discovered that, in order to obtain optimum results from the use of such an arrangement, the perforations must have an effective area at least the equivalent of 0.063 square inch per tooth, and they must be arranged as close to the edge of the saw as is feasible without producing undue weakening directly at the edge. The distance between an edge of a perforation and the closest point of any gullet, however, must be at least equal to the dimension of the perforation measured peripherally of the blade. Additionally, it is necessary that the peripheral spacing between adjacent edges of adjacent perforations shall be at least equal to the dimension of a perforation, measured peripherally of the saw, in order to avoid undue weakening thereof.

Now, in many conventional carbide-tipped saws, the teeth are so closely spaced that it is not possible to arrange therein a single circular series of circular perforations, equal in number to the teeth, in accordance with the above requirements. Thus, as shown in Fig. 1, I have provided a single circular series of circular perforations 14 arranged as close to the blade edge as is feasible, the individual perforations being ⅜ inch in diameter and their number being equal to one-half the number of teeth 11. At 14a, I have indicated what would happen if I attempted to provide a number of such perforations equal to the number of teeth. Quite obviously, adjacent perforations, under such circumstances, would be so close together as to violate the above requirement and to weaken the blade unduly.

As indicated above, it is essential that the dimension 15 be at least equal to the diameter of a perforation 14, and it is my present belief that the dimension 15 should preferably slightly exceed such diameter. It is also essential, in order to maintain desired blade strength, that dimension 18 exceed dimension 15. It is not feasible, I have found, to arrange a second series of perforations, as suggested at 14b, spaced radially inwardly from the series of perforations 14, the holes of such second series corresponding to alternate teeth 11. This is for the reason that such a series of openings, staggered thus with respect to the holes 14, will weaken the blade to an unacceptable extent unless the dimension 16 is at least equal to the dimension 18; and when the holes 14b are spaced inwardly from the blade periphery by such a distance (16), the holes 14b are found to be substantially ineffective to perform the desired stabilizing function, because they are necessarily too far from the blade periphery.

According to the present invention, then, I propose to provide the blade with a series of perforation units, indicated generally by the numeral 13, arranged in a circular series concentric with the series of teeth 11, the number of perforation units 13 being equal to one-half the number of teeth 11. Each such unit is symmetrical on opposite sides of a radius of the blade which substantially bisects the angle included between radii drawn to the deepest points on the boundaries of the two adjacent gullets 12; and one such unit is so arranged with respect to each successive pair of teeth, so that there is one perforation unit for each pair of teeth in the saw; in other words, one-half as many perforation units as teeth. Each such unit has an effective area exceeding the area of a circle having a diameter equal to one-half the peripheral distance, measured on the circle joining the centers of perforations 14, between radii drawn to the deepest points on the boundaries of adjacent gullets. I presently believe an effective area of 0.126 square inch to be a minimum for the effective accomplishment of the desired stabilizing function. I believe it to be essential that the peripheral distance between adjacent edges of adjacent perforation units shall be greater than the minimum distance from an edge of any perforation to the nearest gullet; that is, the dimension 18 and the dimension 19 must exceed the dimension 15.

In the preferred form of my invention, illustrated in Fig. 1, each perforation unit comprises a drilled, circular hole 14, whose diameter must be at least $\frac{5}{16}$ inch and is preferably $\frac{3}{8}$ inch or larger, and a second drilled hole 17, whose diameter must be less than that of the hole 14, but at least $\frac{1}{4}$ inch and preferably $\frac{7}{16}$ inch. The centers of the holes 14 and 17 of each perforation unit are located on a common radius of the saw, which radius substantially bisects the angle included between radii drawn to the deepest points on the boundaries of the gullets 12 just ahead of, and just behind, the location of the perforation unit. The dimension 15 exceeds the diameter of the hole 14, and the dimension 18 exceeds the dimension 15. The dimension 19 will be at least equal to, and preferably somewhat greater than, the dimension 18. The dimension 20 may be just sufficient to prevent the drill from breaking through from one hole into the other during manufacture.

It will be seen that, if the hole 14 has a diameter of $\frac{7}{16}$ inch and the hole 17 has a diameter of $\frac{1}{4}$ inch, the effective area of the perforation unit will be 0.126 square inch.

Figure 2:
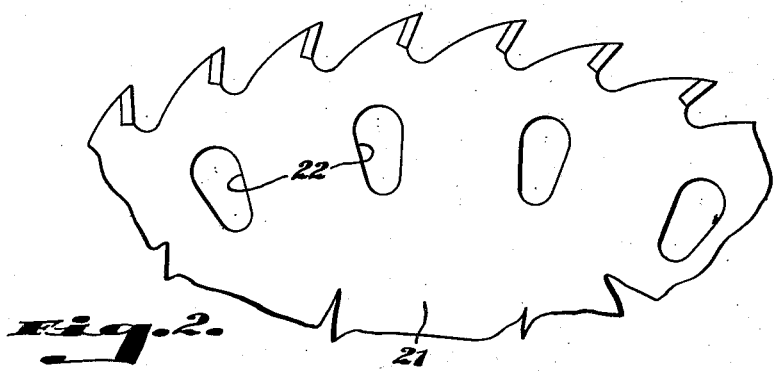
Fig. 2 is a similar view showing a modified form of my invention.

In Fig. 2, I have shown a modified form of my invention, in which each perforation unit 22 in a blade 21 comprises a slot, elongated in a direction radially of the blade. As shown, the radially outer end of each slot is formed on a radius equal to the radius of the hole 14, the radially inner end of each slot is formed on a radius equal to the radius of the hole 17, and the sides of the slot are tangent to the curved ends thereof. The long axis of each slot is located on a radius of the blade which substantially bisects the angle included between radii drawn to the deepest points on the boundaries of the gullets 12 immediately ahead of, and immediately behind, the location of the slot, and there is one slot for each pair of teeth. Thus, the peripheral spacing between adjacent slots closely conforms to the peripheral spacing between adjacent perforation means of Fig. 1, and the effective area of the perforation means of Fig. 2 somewhat exceeds that of Fig. 1. The minimum distance from each perforation means of Fig. 2 to the nearest gullet is substantially the same as that of Fig. 1.

Functionally, the structure of Fig. 2 is believed to be the full equivalent of that of Fig. 1, but of course it is more expensive to manufacture, since the perforation means of the present invention must be cut, rather than punched. Punching would produce undesirable strains in the saw plate.

Figure 3:
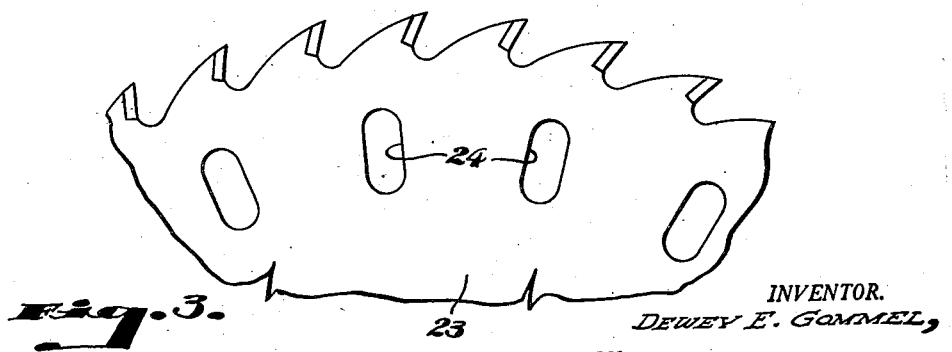
Fig. 3 is a similar view showing a still further form of my invention.

Fig. 3 shows an arrangement similar to that of Fig. 2 except that the inner and outer ends of the slots 24 cut in the blade 23 are formed upon a common radius which, as shown, is equal to that of the holes 17. Thus, the effective area of each perforation unit of Fig. 3 is intermediate those of Fig. 1 and of Fig. 2. Similarly, the cost of manufacture and the functional excellence of the form of Fig. 3 lie between the corresponding characteristics of the forms of Figs. 1 and 2.

By following the teachings of the present disclosure, it is possible to obtain, substantially to their maximum effectiveness, all of the advantages outlined in said Patent No. 2,609,017 in a saw whose diameter is so small, and the number of whose teeth is so great, as to prevent the use therein of the precise teaching of said patent; and I am presently of the opinion that those advantages cannot be obtained, for such a saw, in any other way.

I claim as my invention:

1. A circular saw perforated at its central region for mounting on a spindle, and provided with a peripheral series of teeth separated by gullets, said saw being further provided with perforation units arranged in a circular series concentric with said series of teeth, the number of perforation units being equal to one-half the number of said teeth, the effective area of each perforation unit being at least 0.126 square inch, the distance, peripherally of said saw, between adjacent edges of adjacent perforation units everywhere exceeding the minimum distance from the edge of any perforation unit to the nearest gullet, and the dimension of each perforation unit, in a direction radially of said saw, exceeding the dimension thereof in a direction peripherally of said saw.

2. The saw of claim 1 in which each perforation unit is symmetrical on opposite sides of a radius of said saw which substantially bisects the angle included between radii drawn to the deepest points on the boundaries of the two adjacent gullets.

3. The saw of claim 2 in which each perforation unit comprises two independent circular perforations.

4. The saw of claim 2 in which each perforation unit comprises a non-circular slot elongated radially of said saw.

5. The saw of claim 4 in which each slot diminishes in width, peripherally of said saw, as it approaches the center of said saw.

6. A circular saw perforated at its central region for mounting on a spindle and provided with a peripheral series of teeth separated by gullets, said saw being further provided with perforation units arranged in a circular series concentric with said series of teeth, the number of perforation units being equal to one-half the number of said teeth, the effective area of each perforation unit exceeding the area of a circle having a diameter equal to one-half the peripheral distance between radii drawn to the deepest points on the boundaries of adjacent gullets, measured along a chord joining the radially outermost boundaries of adjacent perforation units, the distance, peripherally of said saw, between adjacent edges of adjacent perforation units everywhere exceeding the minimum distance from the edge of any perforation unit to the nearest gullet, and the dimension of each perforation unit, in a direction radially of said saw, exceeding the dimension thereof in a direction peripherally of said saw.

DEWEY E. GOMMEL.

References Cited in the file of this patent

UNITED STATES PATENTS

| Number | Name | Date |
|---|---|---|
| 213,439 | Miller | Mar. 18, 1879 |
| 2,563,559 | Sneva | Aug. 7, 1951 |
| 2,609,017 | Chapin | Sept. 2, 1952 |